United States Patent
Faruque et al.

(10) Patent No.: US 11,046,270 B1
(45) Date of Patent: Jun. 29, 2021

(54) DISPLACEMENT RESISTANCE DEVICE FOR A VEHICLE CRUSH-CAN ASSEMBLY AND CRUSH-CAN YIELD ADJUSTMENT METHOD

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 16/718,806

(22) Filed: Dec. 18, 2019

(51) Int. Cl.
*B60R 19/32* (2006.01)
*B60R 19/34* (2006.01)

(52) U.S. Cl.
CPC .............. *B60R 19/32* (2013.01); *B60R 19/34* (2013.01)

(58) Field of Classification Search
CPC ....... B60R 19/02; B60R 19/023; B60R 19/26; B60R 19/32; B60R 19/34; B60R 19/36
USPC ........................................ 293/107, 132, 133
See application file for complete search history.

(56) References Cited

U.S. PATENT DOCUMENTS

| | | | |
|---|---|---|---|
| 3,879,023 A * | 4/1975 | Pearce | B60R 19/32 267/64.11 |
| 4,257,581 A * | 3/1981 | Keeler, II | B60R 19/32 188/377 |
| 9,371,048 B2 * | 6/2016 | Farooq | F16F 13/305 |
| 10,266,137 B2 | 4/2019 | Baccouche et al. | |
| 2018/0251087 A1 * | 9/2018 | Gao | B60R 19/38 |
| 2019/0016284 A1 * | 1/2019 | Baccouche | F16F 9/30 |

FOREIGN PATENT DOCUMENTS

| CN | 202219767 U | 5/2012 |
|---|---|---|
| CN | 104088957 A | 10/2014 |
| KR | 20030015729 A | 2/2003 |

* cited by examiner

*Primary Examiner* — Jason S Daniels
(74) *Attorney, Agent, or Firm* — David Coppielle, Esq.; Carlson, Gaskey & Olds, P.C.

(57) ABSTRACT

A vehicle system includes a crush-can assembly that is disposed between a bumper member and a vehicle frame. The crush-can assembly is configured to yield when the bumper member is moved closer to the vehicle frame. The system further includes a displacement resistance device that has a chamber that holds a liquid-nano material. The liquid-nano material is compressed within the chamber to resist a movement of the bumper member toward the vehicle frame.

16 Claims, 7 Drawing Sheets

DISPLACEMENT RESISTANCE DEVICE FOR A VEHICLE CRUSH-CAN ASSEMBLY AND CRUSH-CAN YIELD ADJUSTMENT METHOD

TECHNICAL FIELD

This disclosure relates generally to a crush-can assembly for a vehicle and, more particularly, to a displacement resistance device used in connection with the crush-can assembly.

BACKGROUND

Motor vehicles are known to include front and rear bumpers, which are structures that are attached to or integrated with the front and rear ends of the vehicle, respectively, and configured to absorb loads. Crush-can assemblies can couple the bumpers to the vehicle frame. The crush-can assemblies can absorb some of the loads applied to the bumper.

SUMMARY

A vehicle system according to an exemplary aspect of the present disclosure includes, among other things, a crush-can assembly that is disposed between a bumper member and a vehicle frame. The crush-can assembly is configured to yield when the bumper member is moved closer to the vehicle frame. The system further includes a displacement resistance device that has a chamber that holds a liquid-nano material. The liquid-nano material is compressed within the chamber to resist a movement of the bumper member toward the vehicle frame.

In another example of the foregoing system, the crush-can assembly has an interior. The chamber is disposed entirely outside the interior.

In another example of any of the foregoing systems, no portion of the chamber is disposed between the bumper member and the vehicle frame.

In another example of any of the foregoing systems, the displacement resistance device includes a rack and pinion. The rack is configured to urge the pinion to rotate when the bumper member is urged toward the vehicle frame by a force applied to the bumper member. The liquid in the chamber resists a rotation of the pinion to increase the force required to move the bumper member toward the vehicle frame.

Another example of any of the foregoing systems includes a bracket that is secured to the crush-can assembly. The chamber is held by the bracket.

In another example of any of the foregoing systems, the pinion has a first end held by the bracket and a second end that extends into the chamber.

In another example of any of the foregoing systems, the second end of the pinion threadably engages the chamber.

In another example of any of the foregoing systems, the rack includes a portion that extends into an interior of the crush-can. The pinion and the chamber are disposed entirely outside the interior of the crush-can.

In another example of any of the foregoing systems, the chamber and the pinion are aft the crush-can assembly relative to a general orientation of a vehicle that has the crush-can assembly.

In another example of any of the foregoing systems, the liquid-nano material includes a plurality of nanoporous particles that are suspended within a chemically inert liquid.

In another example of any of the foregoing systems, the plurality of nanoporous particles are silicon and the chemically inert liquid is oil or water.

A crush-can yield adjustment method according to another exemplary aspect of the present disclosure includes, among other things, holding a liquid-nano material within a chamber that is separate from a crush-can assembly. The crush-can assembly is disposed between a bumper member and a vehicle frame. The crush-can assembly is configured to yield when the bumper member is moved closer to the vehicle frame. The method further includes resisting movement of the bumper member toward the vehicle frame using the liquid-nano material.

In another example of the foregoing method, the crush-can assembly has an interior. The chamber is disposed entirely outside the interior.

In another example of any of the foregoing methods, the method further includes applying a force to the bumper member. The method further includes using a rack to resist movement of the bumper member toward the vehicle frame in response to the force, using a pinion to resist movement of the rack, and using the liquid-nano material to resist rotation of the pinion.

In another example of any of the foregoing methods, the rack extends into an interior of the crush-can assembly. The chamber and the pinion are aft the crush-can assembly relative to a general orientation of a vehicle that has the crush-can assembly.

In another example of any of the foregoing methods, the liquid-nano material includes a plurality of nanoporous particles suspended within a chemically inert liquid.

In another example of any of the foregoing methods, the plurality of nano-porous particles are silicon and the chemically inert liquid is oil or water.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to vehicle crush-can assemblies that utilize displacement resistance devices having liquid-nano material. The displacement resistance devices increase an amount of force that must be applied to a bumper in order to cause the crush-can assemblies to yield.

Figure 1:
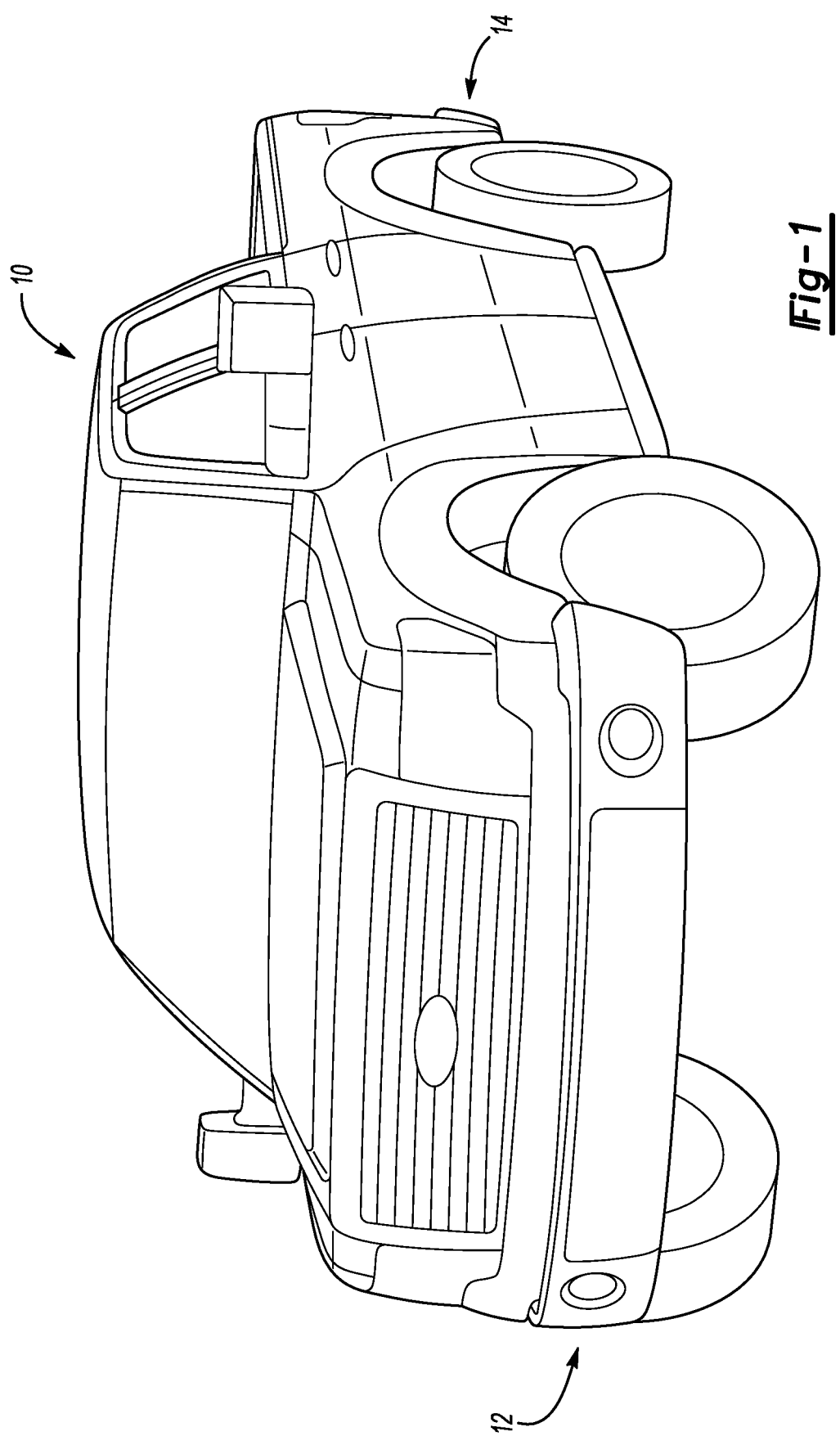
FIG. 1 illustrates a perspective view of a vehicle having a front bumper and a rear bumper.

FIG. 1 illustrates a motor vehicle 10, which, in this example, is a pickup truck. The vehicle 10 includes a front bumper 12 and a rear bumper 14.

Figure 2:
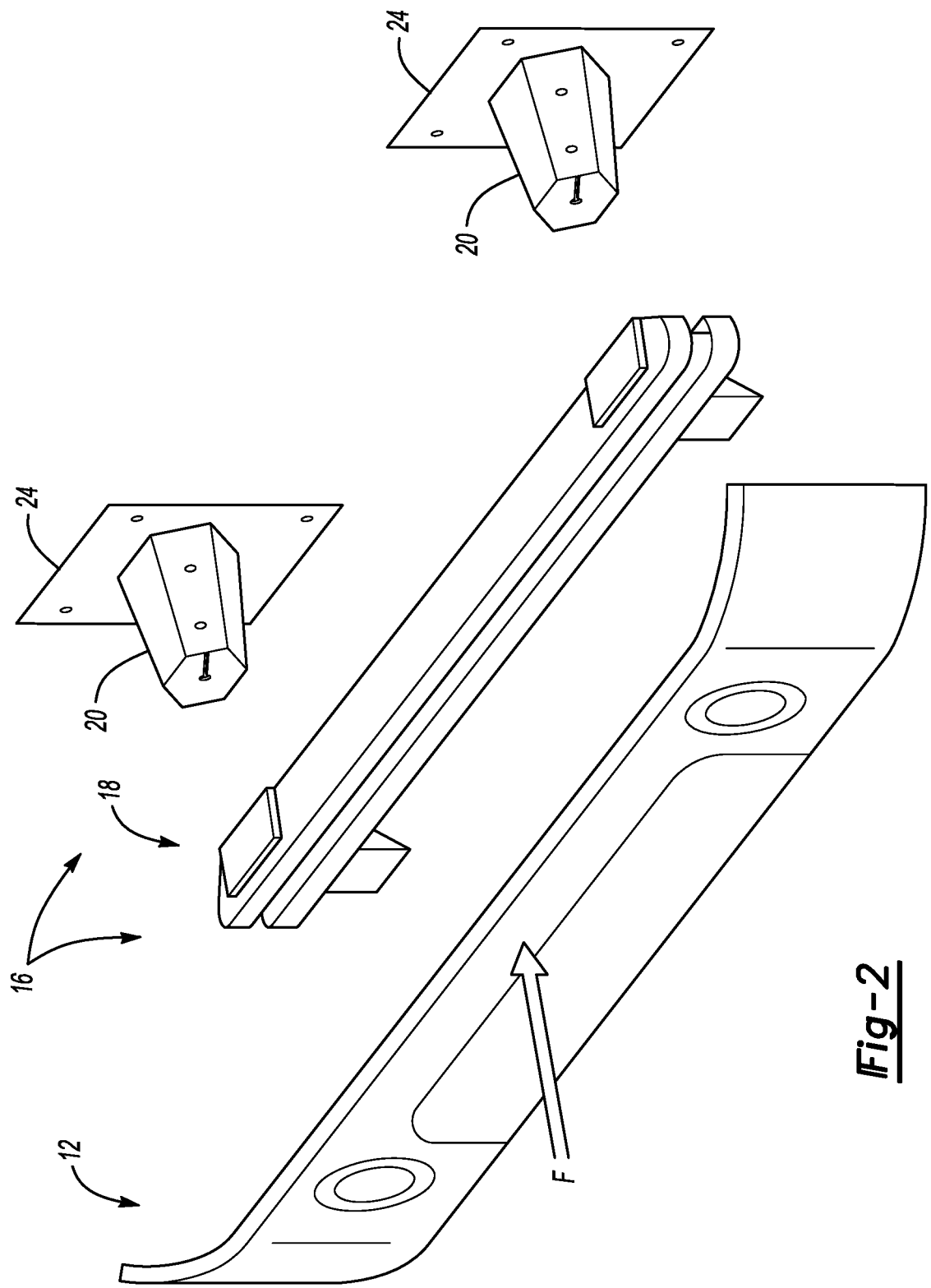
FIG. 2 illustrates an expanded view of the front bumper and a bumper support system of the vehicle of FIG. 1.
Figure 3:
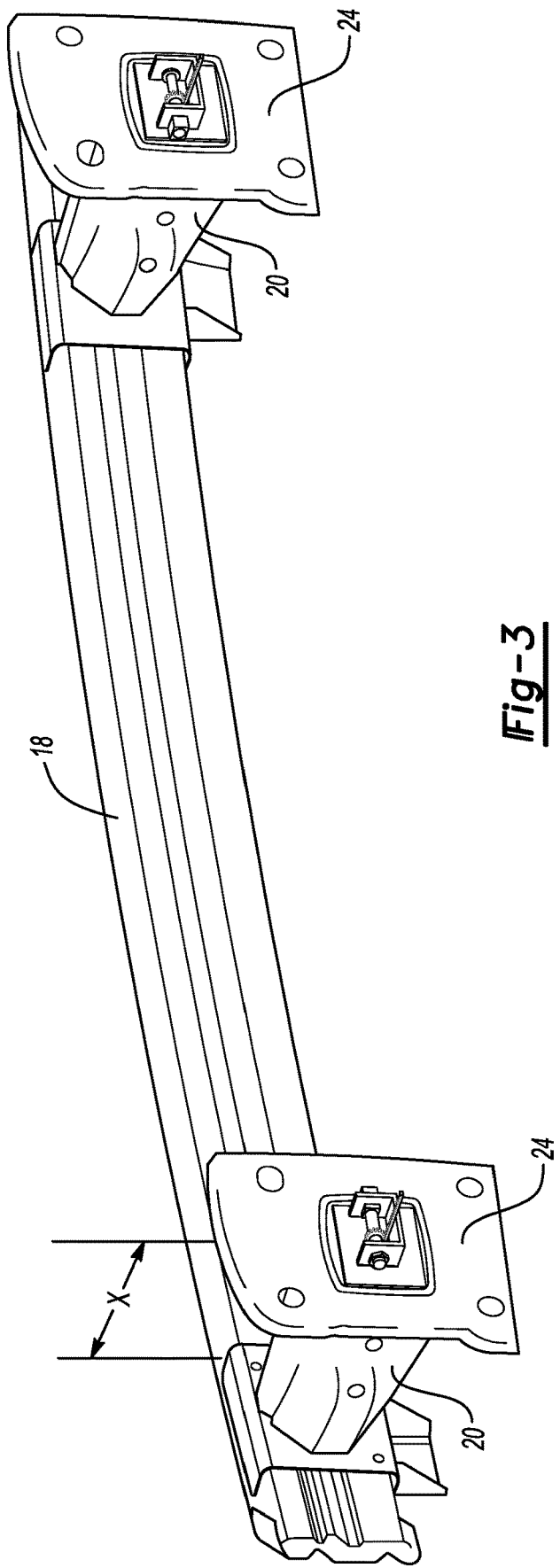
FIG. 3 illustrates a rear view of the bumper support system of FIG. 2.
Figure 4:
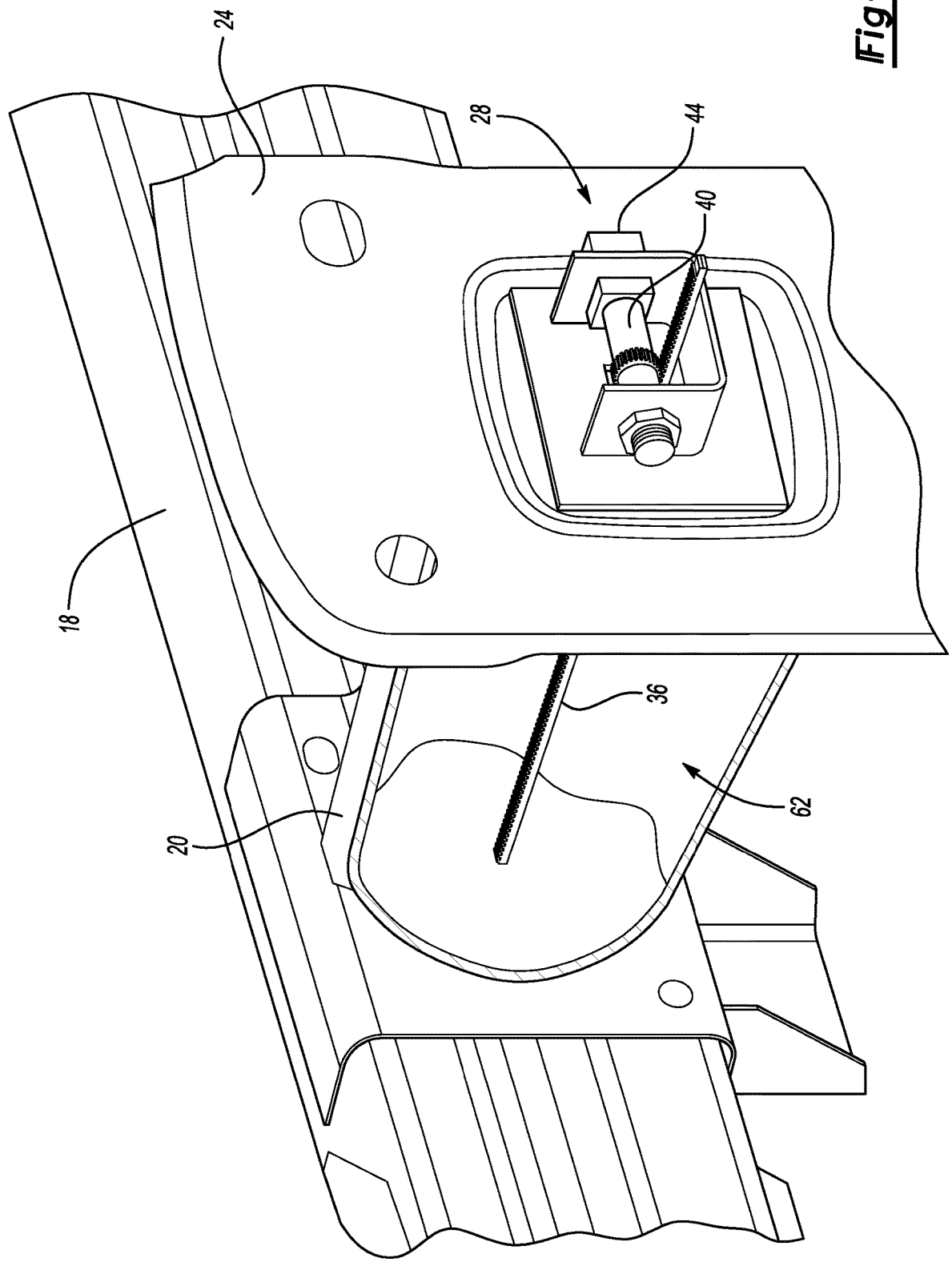
FIG. 4 illustrates a close up view of an area of the bumper support system of FIG. 3 with a partially section view of a crush-can assembly of the bumper support system.
Figure 5:
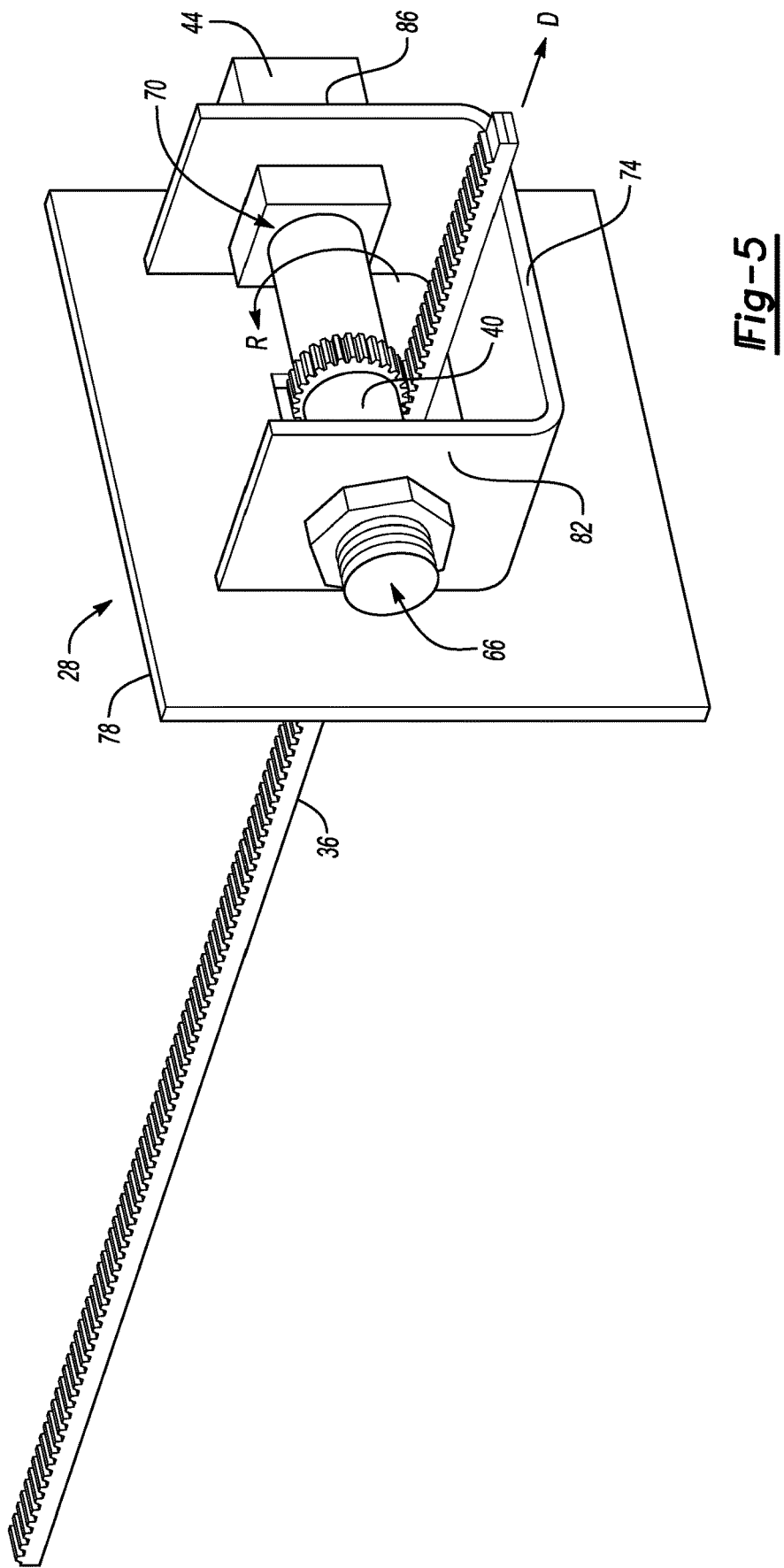
FIG. 5 illustrates a displacement resistance device utilized with the crush-can assembly of FIG. 4.
Figure 6:
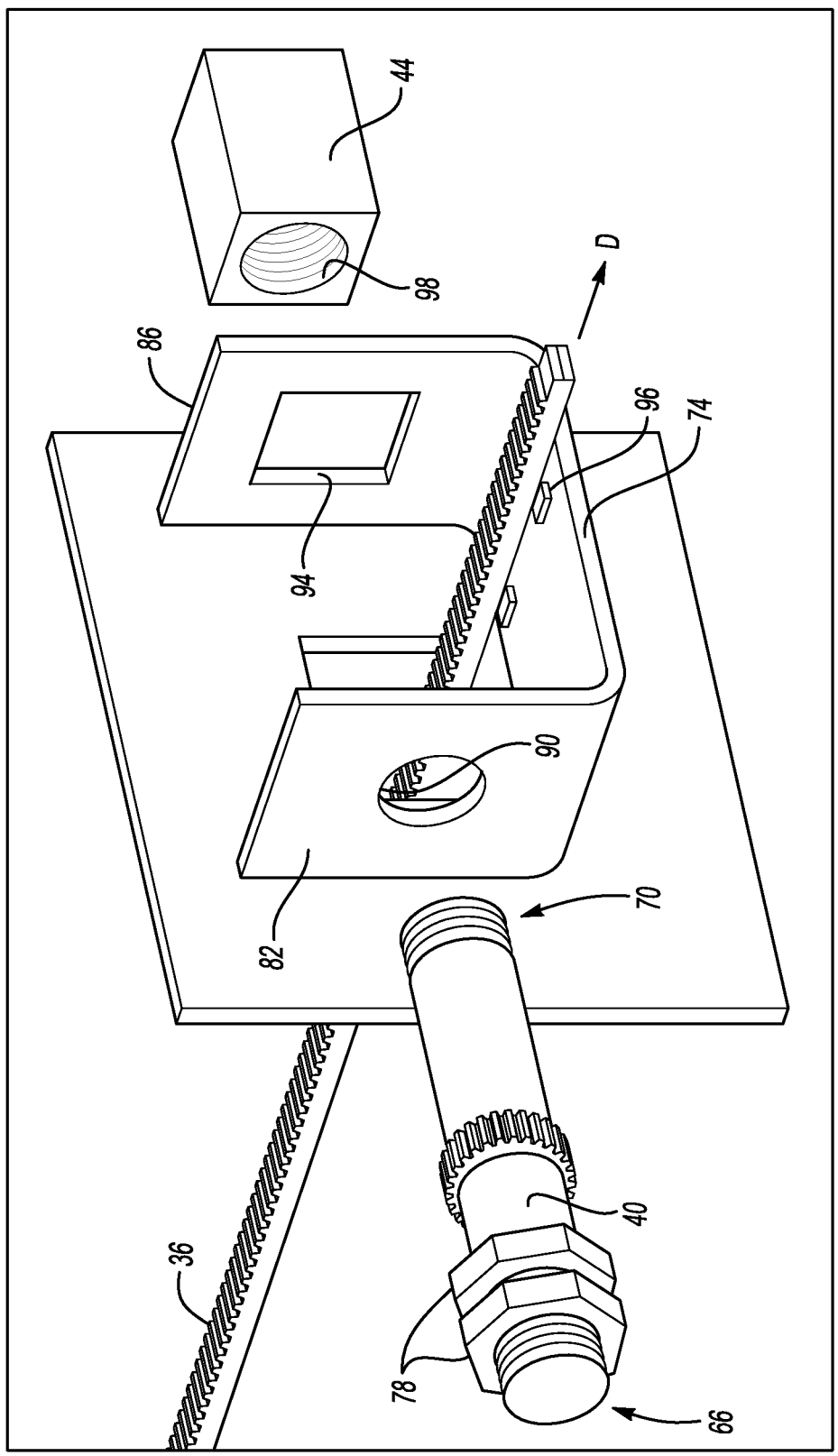
FIG. 6 illustrates an expanded view of selected portions of the displacement resistance device of FIG. 5.

FIG. 2 illustrates an expanded view of the front bumper 12 and a bumper support system 16 that supports the front bumper 12. The bumper support system 16 includes a bumper beam 18, and crush-can assemblies 20 disposed between the bumper beam 18 and portions of a vehicle frame 24. Crush-can assemblies could be used elsewhere on the vehicle 10, such as in connection with the rear bumper 14.

When installed within the vehicle 10, the front bumper 12 is mounted to the bumper beam 18. The crush-can assemblies 20, one on a passenger side and one on a driver side of the vehicle 10, secure the bumper beam 18 to portions of the vehicle frame 24. When a force F, such as an impact load, is applied to the front bumper 12, the crush-can assemblies 20 manage energy distribution associated with the force.

Referring now to FIGS. 3-6, if the force F exceeds a threshold force level, one or both of the crush-can assemblies 20 can yield permitting movement of the bumper beam 18 closer to the vehicle frame 24. As the crush-can assemblies 20 yield, a distance X between the bumper beam 18 and the vehicle frame 24 decreases.

The crush-can assemblies 20, the exemplary embodiment, are frustoconcical. The crush-can assemblies 20 can be formed from metal, for example.

The threshold force level that is required to cause the crush-can assemblies 20 to yield can vary based on a design of the crush-can assemblies 20. For example, a thickness of the metal could be increased if a higher threshold force level is desired. The threshold force level that is required to cause the crush-can assemblies 20 to yield can also vary based on, among other things, a weight of the vehicle 10 and an architecture of the vehicle 10.

While the crush-can assemblies 20 can be designed for specific vehicle architectures, this increases part complexity as a specific type of crush-can assembly may be required for each vehicle architecture. As can be appreciated, utilizing a common crush-can assembly design across multiple vehicle platforms can help to reduce part complexity.

Accordingly, the crush-can assemblies 20 of the exemplary embodiment are each utilized in connection with a displacement resistance device 28. The displacement resistance device 28 can resist movement of the bumper beam 18 toward the vehicle frame 24 in response to the force F, which increases the threshold force level that must be reached before the associated crush-can assembly 20 yields. Resisting movement of the bumper beam 18 toward the vehicle frame 24 with the displacement resistance device 28 increases the threshold force level that must be reached to cause the crush-can assembly 20 to yield. The increased threshold force level is needed in order to overcome the resistance provided by the displacement resistance device 28. The resistance provided by the displacement resistance device 28 is relatively easy to adjust.

Figure 7:
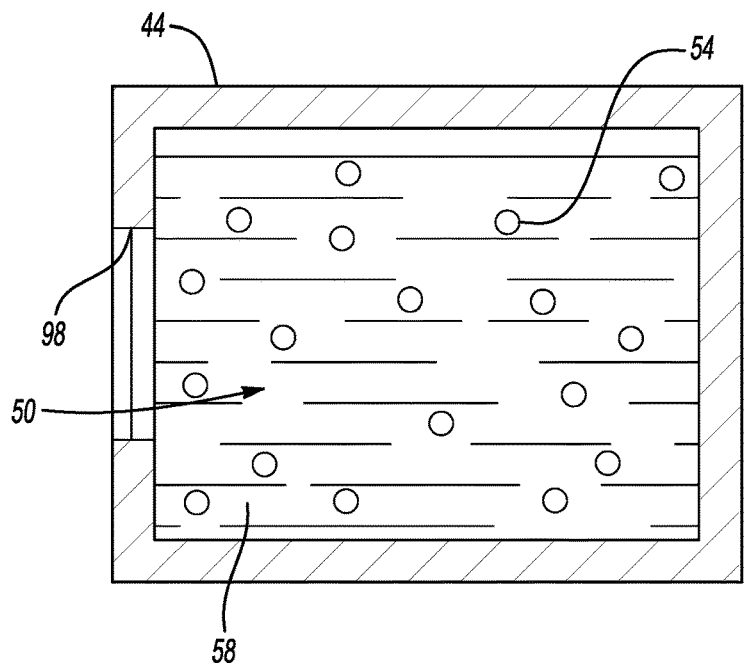
FIG. 7 illustrates a section view of a chamber of the displacement resistance device.

The displacement resistance device 28, in the example embodiment, has a rack and pinion system that is used to resist displacement. The rack and pinion system includes a rack 36, a pinion 40, and a chamber 44 that holds a liquid-nano material 50 (FIG. 7).

The rack 36 extends from the pinion 40 to a rear of the bumper beam 18. When the force F is applied, the force F urges the rack 36 in the direction D. Teeth of the rack 36 are engaged with teeth of the pinion 40. Thus, movement of the rack 36 in the direction D is resisted by the pinion 40.

In order for the rack 36 to move in the direction R, the rack 36 needs to rotate the pinion 40 in the direction R. Rotation of the pinion 40 in the direction R requires, in the exemplary embodiment, the chamber 44 to translate relative to the pinion 40 along a rotational axis of the pinion 40 such that the pinion 40 extends further into the chamber 44. Relative movement of the pinion 40 into the chamber 44 reduces a volume of the chamber 44 thereby requiring compression of the liquid-nano material 50 held within the chamber 44.

The threshold force level required to move the rack 36 in the direction R is thus directly related to the compression resistance provided by the liquid-nano material 50 within the chamber 44. In the exemplary embodiment, the bumper beam 18 does not move closer to the vehicle frame 24 to cause the crush-can assembly 20 to yield until the rack 36 is moved in the direction R. The threshold force level required to cause the crush-can assembly 20 to yield is thus also directly related to the compression resistance provided by the liquid-nano material 50 within the chamber 44. If the liquid-nano material 50 prevents rotation of the pinion 40 relative to the chamber 44, linear movement of the rack 36 in the direction D is prevented.

The liquid-nano material 50, in the exemplary embodiment, includes a plurality of nanoporous particles 54 suspended within a liquid 58. The nanoporous particles 54 can be silicon, and the liquid 58 can be a chemically inert liquid, such as oil or water. Exemplary nanoporous particles can remain hydrophobic at certain pressures, and then take in liquid in response to an increased pressure. Thus, within the chamber 44, the liquid-nano material 50 can limit rotation of the pinion 40 relative to the chamber 44 until the pressure on the liquid-nano material 50 exceeds a threshold pressure. After which, the nanoporous particles 54 take in liquid to effectively reduce a volume of the liquid-nano material 50 within the chamber 44. The reduced volume permits rotation of the pinion 40 relative to the chamber 44 such that the pinion 40 can extend further into the chamber 44. In some examples, the threshold pressure can be designed to vary from 0.5 MPa to 50 MPa while volume change can be as high as 80 percent.

The compression resistance provided by the liquid-nano material 50 within the chamber 44 can be altered by adjusting a mixture of the nanoporous particles 54 and the liquid 58. By adjusting the compression resistance of the liquid-nano material 50, the threshold force level required to cause the crush-can assembly 20 to yield and move the bumper beam 18 closer to the vehicle frame 24 can be adjusted.

The displacement resistance device 28 can thus be adjusted to provide a desired resistance to crush-can yield without requiring substantial modifications to the crush-can assembly 20. The displacement resistance device 28 can be adjusted to facilitate the use of a common crush-can assembly among a variety of different vehicle architectures and different vehicle weights.

The adjusting of the displacement resistance device 28 can occur by increasing or decreasing the compression resistance provided by the displacement resistance device 28, for example, by changing the composition of the liquid-nano material 50 held within the chamber 44, by changing an amount of the liquid-nano material 50 held within the chamber 44, or both.

The exemplary crush-can assembly 20 includes an interior 62. The rack 36 extends through the interior 62 forward relative to an orientation of the vehicle 10 (FIG. 1) to a position where the rack 36 is attached to the bumper beam 18. The rack 36 extends longitudinally aft relative to the orientation of the vehicle 10 to a position where teeth of the rack 36 engage with teeth of the pinion 40.

The pinion 40 extends from a first end portion 66 to a second end portion 70. The first end portion 66 is secured within a bracket 74 between two threaded nuts 78. The spacing between the nuts 78 is sufficient to permit rotation of the pinion 40.

In the exemplary embodiment, the bracket 74 has a U-shaped configuration with a first leg 82 and a second leg 86. The first leg 82 provides an aperture 90 that receives the first end 66 of the pinion 40. The nuts 78 are disposed on opposite side of the first leg 82. The nuts 78 permit rotation of the pinion 40, but substantially prevent the pinion 40 from translating relative to the bracket 74 along a rotational axis of the pinion 40. The second leg 86 includes an aperture 94 that receives and holds the chamber 44 such that the chamber 44 is blocked from rotating when the pinion 40 rotates. The bracket 74 can, in some examples, include guides 96 to ensure movement of the rack 36 is along the direction D.

The second end portion 70 of the pinion 40 threadably engages with an aperture 98 of the chamber 44. Rotating the pinion 40 in the direction R translates the chamber 44 axially relative to the pinion 40 such that the end portion 70 of the pinion 40 is inserted further into an interior of the chamber 44.

While a rack and pinion system is shown, other embodiments of the displacement resistance device 28 could compress a liquid-nano material in other ways to provide a desired amount of resistance.

Figure 8:
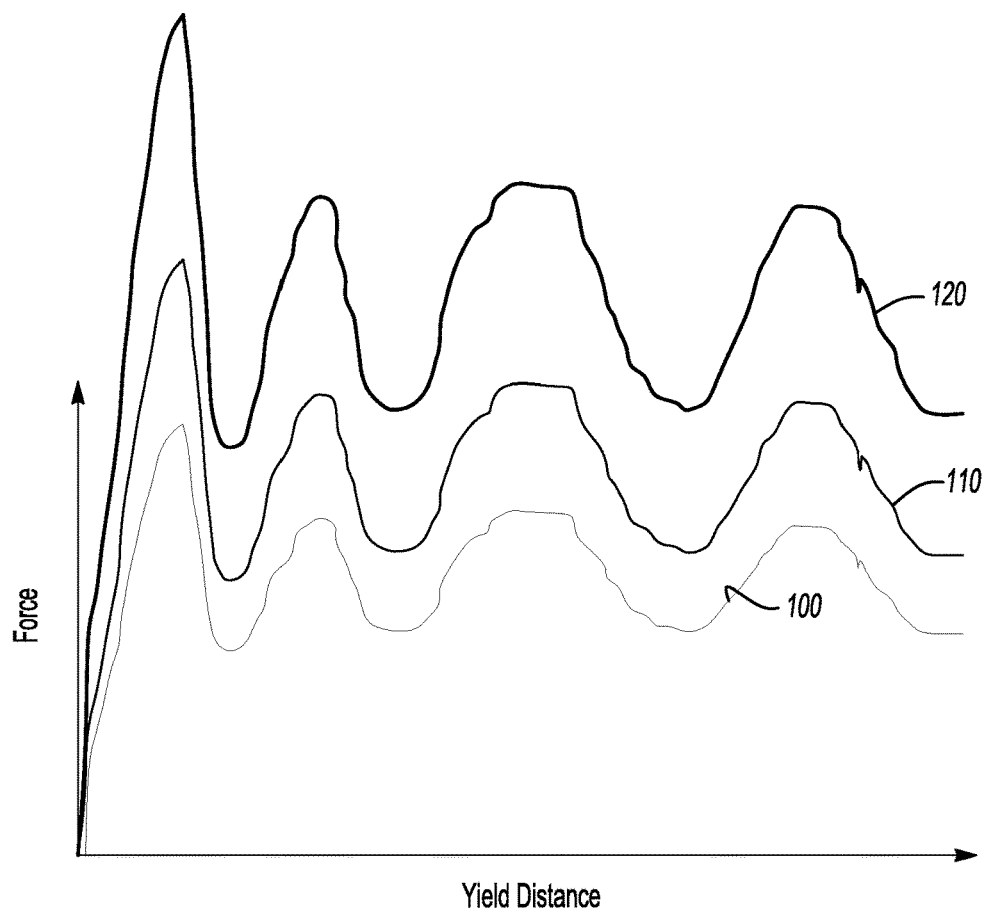
FIG. 8 graphically illustrates a plot of force versus crush distance for a first crush-can that is not utilizing a displacement resistance device, a second crush-can that is utilizing a displacement resistance device that provides a first resistance, and a third crush-can that is utilizing a displacement resistance device that provides a second resistance.

With reference now to FIG. 8, a line 100 represents a force versus yield distance for a crush-can assembly that does not include a displacement resistance device. A line 110 represents the crush-can assembly represented by the line 100, but with the addition of a displacement resistance device providing a first amount of resistance. Line 120 represents the crush-can assembly in line 100 utilized with a second type of displacement resistance device that provides a second amount of resistance that is greater than the first amount of resistance. The second type of displacement resistance device could differ from the first type of displacement device only because a different composition or type of liquid-nano material is utilized.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle system, comprising:
a crush-can assembly disposed between a bumper member and a vehicle frame, the crush-can assembly configured to yield when the bumper member is moved closer to the vehicle frame; and
a displacement resistance device including a chamber that holds a liquid-nano material, the liquid-nano material compressed within the chamber to resist a movement of the bumper member toward the vehicle frame, wherein the crush-can assembly has an interior, the chamber disposed entirely outside the interior.

2. The vehicle system of claim 1, wherein no portion of the chamber is disposed between the bumper member and the vehicle frame.

3. The vehicle system of claim 1, wherein the liquid-nano material comprises a plurality of nanoporous particles suspended within a chemically inert liquid.

4. The vehicle system of claim 3, wherein the plurality of nanoporous particles are silicon and the chemically inert liquid is oil or water.

5. A vehicle system, comprising:
a crush-can assembly disposed between a bumper member and a vehicle frame, the crush-can assembly configured to yield when the bumper member is moved closer to the vehicle frame; and
a displacement resistance device including a chamber that holds a liquid-nano material, the liquid-nano material compressed within the chamber to resist a movement of the bumper member toward the vehicle frame, wherein the displacement resistance device includes a rack and a pinion, the rack configured to urge the pinion to rotate when the bumper member is urged toward the vehicle frame by a force applied to the bumper member, wherein the liquid in the chamber resists a rotation of the pinion to increase the force required to move the bumper member toward the vehicle frame.

6. The vehicle system of claim 5, further comprising a bracket secured to the crush-can assembly, the chamber held by the bracket.

7. The vehicle system of claim 6, wherein the pinion has a first end held by the bracket and a second end extending into the chamber.

8. The vehicle system of claim 7, wherein the second end of the pinion threadably engages the chamber.

9. The vehicle system of claim 5, wherein the rack includes a portion that extends into an interior of the crush-can, wherein the pinion and the chamber are disposed entirely outside the interior of the crush-can.

10. The vehicle system of claim 9, wherein the chamber and the pinion are aft the crush-can assembly relative to a general orientation of a vehicle having the crush-can assembly.

11. A crush-can yield adjustment method, comprising:
holding a liquid-nano material within a chamber that is separate from a crush-can assembly, the crush-can assembly disposed between a bumper member and a vehicle frame, the crush-can assembly configured to yield when the bumper member is moved closer to the vehicle frame; and
resisting movement of the bumper member toward the vehicle frame using the liquid-nano material.

12. The crush-can yield adjustment method of claim 11, wherein the crush-can assembly has an interior, the chamber disposed entirely outside the interior.

13. The crush-can yield adjustment method of claim 11, further comprising:
applying a force to the bumper member;
using a rack to resist movement of the bumper member toward the vehicle frame in response to the force;
using a pinion to resist movement of the rack; and
using the liquid-nano material to resist rotation of the pinion.

14. The crush-can yield adjustment method of claim 13, wherein the rack extends into an interior of the crush-can assembly, wherein the chamber and the pinion are aft the crush-can assembly relative to a general orientation of a vehicle having the crush-can assembly.

15. The crush-can yield adjustment method of claim 11, wherein the liquid-nano material comprises a plurality of nanoporous particles suspended within a chemically inert liquid.

16. The crush-can yield adjustment method of claim 15, wherein the plurality of nano-porous particles are silicon and the chemically inert liquid is oil or water.

\* \* \* \* \*